(12) United States Patent
Wirth

(10) Patent No.: US 10,859,189 B2
(45) Date of Patent: Dec. 8, 2020

(54) JOINING METHOD FOR TUBULAR COMPONENTS

(75) Inventor: Georg Wirth, Kirchheim/Teck (DE)

(73) Assignee: EBERSPAECHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 2076 days.

(21) Appl. No.: 12/566,294

(22) Filed: Sep. 24, 2009

(65) Prior Publication Data

US 2010/0083482 A1    Apr. 8, 2010

(30) Foreign Application Priority Data

Oct. 2, 2008    (DE) .................. 10 2008 049 925

(51) Int. Cl.
| | | |
|---|---|---|
| B23K 31/00 | (2006.01) | |
| F16L 13/02 | (2006.01) | |
| F01N 13/18 | (2010.01) | |
| F01N 3/28 | (2006.01) | |

(52) U.S. Cl.
CPC ........ *F16L 13/0227* (2013.01); *F01N 3/2892* (2013.01); *F01N 13/1805* (2013.01); *F01N 13/185* (2013.01); *F01N 2450/22* (2013.01); *Y10T 29/49906* (2015.01)

(58) Field of Classification Search
USPC ............... 228/173.2, 173.4; 29/505, 525.14; 285/382
See application file for complete search history.

(56) References Cited

U.S. PATENT DOCUMENTS

| | | | | |
|---|---|---|---|---|
| 2,125,324 A | * | 8/1938 | Williams et al. ............... | 285/22 |
| 2,646,995 A | * | 7/1953 | Thompson ........... | B23K 9/0358 |
| | | | | 228/138 |
| 3,149,860 A | * | 9/1964 | Hallesy ........................ | 285/18 |
| 3,466,066 A | * | 9/1969 | Dawson ........................ | 285/39 |
| 3,466,738 A | * | 9/1969 | Mount .......................... | 29/525 |
| 3,476,413 A | * | 11/1969 | Brown et al. ............. | 285/332.3 |
| 3,486,774 A | * | 12/1969 | Corey ...................... | 285/334.5 |
| 3,494,640 A | * | 2/1970 | Brown et al. ................ | 285/115 |

(Continued)

FOREIGN PATENT DOCUMENTS

| | | |
|---|---|---|
| DE | 87 01 121.2 U1 | 6/1987 |
| DE | 102 44 798 A1 | 4/2004 |

(Continued)

OTHER PUBLICATIONS

Englsih machine translation of DE 10257224, Jun. 24, 2004.*

(Continued)

*Primary Examiner* — Erin B Saad
*Assistant Examiner* — Carlos J Gamino

(57) ABSTRACT

A method for joining two components, of which at least one is tubular in shape, more preferably of an exhaust system of an internal combustion engine. The joint can be produced in an easier manner with high quality if a ring-shaped joining element having an outer cone on at least one axial side with its outer cone is axially pressed into an axial end section of the one tubular component, as a result of which the end section of the one component widens along the outer cone when on its axial end of the widened end section and on the joining element a circumferential weld seam is produced and when the other component on an axial end section is joined with the joining element.

20 Claims, 4 Drawing Sheets

(56) References Cited

U.S. PATENT DOCUMENTS

| | | | | |
|---|---|---|---|---|
| 3,523,590 A | * | 8/1970 | Straw | F01N 13/1838 181/282 |
| 3,602,531 A | * | 8/1971 | Patry | 285/148.23 |
| 3,686,747 A | * | 8/1972 | Bagnulo | 29/508 |
| 4,114,930 A | * | 9/1978 | Perkins et al. | 285/334.5 |
| 4,307,833 A | * | 12/1981 | Barnard | 228/136 |
| 4,425,304 A | * | 1/1984 | Kawata | F01N 3/2853 422/171 |
| 4,625,511 A | * | 12/1986 | Scheitlin | F01N 3/0211 422/168 |
| 4,645,247 A | * | 2/1987 | Ward | 285/382.1 |
| 4,769,897 A | * | 9/1988 | Moseman | 29/525 |
| 4,782,661 A | * | 11/1988 | Motley | F01N 3/2857 422/170 |
| 4,867,486 A | * | 9/1989 | Fukata et al. | 285/222 |
| 4,930,817 A | * | 6/1990 | Fuchs | F01N 13/10 228/173.4 |
| 4,969,264 A | * | 11/1990 | Dryer | F01N 3/2857 29/516 |
| 5,120,086 A | * | 6/1992 | Nock | 285/334.2 |
| 5,171,046 A | * | 12/1992 | Iwata et al. | 285/331 |
| 5,380,048 A | * | 1/1995 | Vogel | 285/22 |
| 5,749,604 A | * | 5/1998 | Williams | 285/39 |
| 5,829,132 A | * | 11/1998 | Sickels | B23P 11/005 29/505 |
| 5,953,817 A | * | 9/1999 | Watanabe | F01N 3/2857 29/890 |
| 5,980,837 A | * | 11/1999 | Umin | F01N 3/2853 422/171 |
| 6,101,714 A | * | 8/2000 | Schmitt | B01D 53/9454 29/463 |
| 6,324,758 B1 | * | 12/2001 | Huang | B21D 26/033 29/515 |
| 6,568,078 B2 | * | 5/2003 | Eisenstock | B23P 19/04 29/515 |
| 6,910,618 B2 | * | 6/2005 | Gendron | 228/168 |
| 7,107,662 B1 | * | 9/2006 | Levario | 29/505 |
| 8,955,887 B2 | * | 2/2015 | Tsuru | B23K 20/002 285/289.5 |
| 2002/0054844 A1 | * | 5/2002 | Pfeifer | B01D 53/9418 423/239.1 |
| 2004/0265191 A1 | * | 12/2004 | Tursky | 422/179 |
| 2006/0130471 A1 | | 6/2006 | Holder et al. | |
| 2010/0295296 A1 | * | 11/2010 | Kawamata | 285/382.5 |

FOREIGN PATENT DOCUMENTS

| | | |
|---|---|---|
| DE | 102 57 224 A1 | 6/2004 |
| DE | 10 2007 048 929 A1 | 4/2009 |

OTHER PUBLICATIONS http://www.irly.ca/irly/corp/0760.HTM, "Hose End Accessories & Water Timers", 2006 (Year: 2006).* http://gear.tinyfarmblog.com/gilmour-hose-menders-couplers/, "Gilmour hose menders & couplers", Jan. 20, 2008 (Year: 2008).* http://www.flashoffroad.com/Maintenance/hvac/heaterQuickFix.htm, "Front Heater Bypass", Jun. 17, 2008 (Year: 2008).*

* cited by examiner

JOINING METHOD FOR TUBULAR COMPONENTS

CROSS-REFERENCE TO RELATED PATENT APPLICATIONS

This patent application claims the benefit of co-pending German Patent Application No. DE 102008049925.0, filed Oct. 2, 2008, the entire teachings and disclosure of which are incorporated herein by reference thereto.

FIELD OF THE INVENTION

The present invention relates to a method for the joining of two components of which at least one is tubular, and more specifically, a method of joining two components in an exhaust system of an internal combustion engine. The invention additionally relates to an assembly for an exhaust system of an internal combustion engine with two components of which at least one is tubular and which are joined with each other. Furthermore, the invention relates to a joining element for such a joining method or for such an assembly.

BACKGROUND OF THE INVENTION

In the manufacture of exhaust gas treatment devices, such as for example particle filters and catalytic converters, it is usual to axially slide into a tubular housing a ceramic insert, namely the respective catalytic converter or particle filter during the so-called "canning" together with a bearing mat enclosing the insert. The manufacture of the ceramic inserts involves relatively large shape tolerances so that it is usual to dimension the housing, with respect to its internal cross section, so large that the insert with bearing mat can be introduced even with the largest expected external cross section. After this, the housing is calibrated, i.e. the cross section of the housing is reduced as a function of the cross section of the insert inserted therein so far until a predetermined radial preload or compression of the bearing mat is achieved. Alternatively, it is also possible to measure the insert in advance and to calibrate the housing before sliding in the insert. In both cases this procedure results in that the cross section of the calibrated housing varies within a wide range. When joining the housing, for example, with a joining funnel, this varying cross section of the calibrated housing now has to be joined gas-tight with a predetermined cross section of the funnel which only varies in comparatively close dimensional tolerances. Inevitably, this creates gaps which are larger or smaller in size that have to be closed with weld seams. This is mechanically difficult to realize so that manual rework is required. Furthermore, this can lead to comparatively large axial transition regions which have to be made available for tools during sheet metal forming and with axial tolerances of the components with usual forming. Since the external space in vehicle applications is regularly limited attempts can be made to install these transitions in the bearing pipe, i.e. into the housing of the exhaust gas treatment device, specifically above the respective ceramic insert. As a result, with axially small inserts, the carrying bearing length of the bearing mat, which is characterized by a constant narrow gap along the bearing mat, is shortened which results in a weakening of the bearing previously calibrated with major effort.

BRIEF SUMMARY OF THE INVENTION

Embodiments of the present invention deal with the problem of stating an improved embodiment for a joining method of the kind mentioned at the outset or for an assembly with two components joined with each other which is more preferably characterized in that automated manufacture with high quality of the joint can be realised in a simpler manner.

Embodiments of the invention are based on the general idea of joining two components with the help of a ring-shaped joining element which comprises at least one outer cone with which it can be pressed into an axial end section of the one component of tubular design in such a manner that the end section of the one component is widened along this outer cone. A circumferential weld seam can now be produced on this widened end section which joins the joining element with the one component. The respective other component can then be attached to the joining element on the side facing away from the one component. Through the predetermined outer cone of the joining element, a ring-shaped closed contact between the joining element and the one component can be realised for the end section of the one component widened with said outer cone in that the widened end section of necessity comes to bear flat on the outer cone of the joining element. Through the no-play and flat contact, a high-quality weld joint can be produced comparatively easily which joins an axial end of the widened end section with the joining element. Using the joining element thus simplifies the mechanical or automated manufacture of a high-quality joint between the two components. The other component—depending on design—can likewise be joined with the joining element by way of such an outer cone or in conventional manner for example by way of a predetermined joining cross section of the joining element or by way of a flange formed on the joining element.

According to another embodiment, the connecting element with its outer cone can be pressed into the end section of the one component so far until the axial end of the end section reaches a predetermined cross section or until the axial end of the end section comes to bear against an axial stop formed on the joining element. Because of this, a predetermined dimension is created on the widened end section. Following this, the weld seam can be produced on this predetermined cross section which more preferably simplifies the automatic manufacture of the high-quality weld joint. Here, the axial stop in addition to defining the predetermined cross section for the widened axial end of the one component brings about a definition of the axial position of the weld seam on the joining element. This also simplifies the automatic manufacture of the high-quality weld joint.

Further important features and advantages of the invention are obtained from the subclaims, from the drawings and from the corresponding figure description by means of the drawings.

It is to be understood that the features mentioned above and still to be explained in the following cannot only be used in the respective combinations stated but also in other combinations or standing by themselves without leaving the scope of the present invention.

BRIEF DESCRIPTION OF THE DRAWINGS

Preferred exemplary embodiments of the invention are shown in the drawings and are explained in more details in the following description wherein identical reference symbols refer to identical or similar or functionally identical components. In the drawings.

DETAILED DESCRIPTION OF THE INVENTION

According to FIGS. 1-9, an assembly 1 comprises two components 2, 3, of which at least the one component 2 is tubular in shape. The other component 3 can likewise be tubular in shape but in principle it can also have any other shape. For example, according to FIG. 7, the other component 3 can be a transition funnel or a flange or a wall. The one component 2 in the following is also designated first component 2 while the other component 3 in the following is also designated as second component 3.

Figure 1:
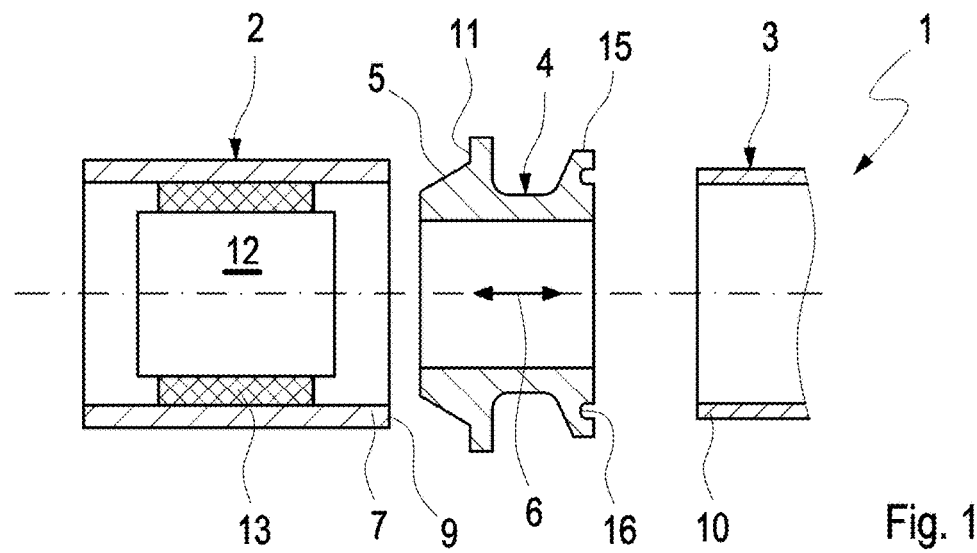
FIG. 1 is a greatly simplified longitudinal section through an assembly prior to the producing of a joint.
Figure 2:
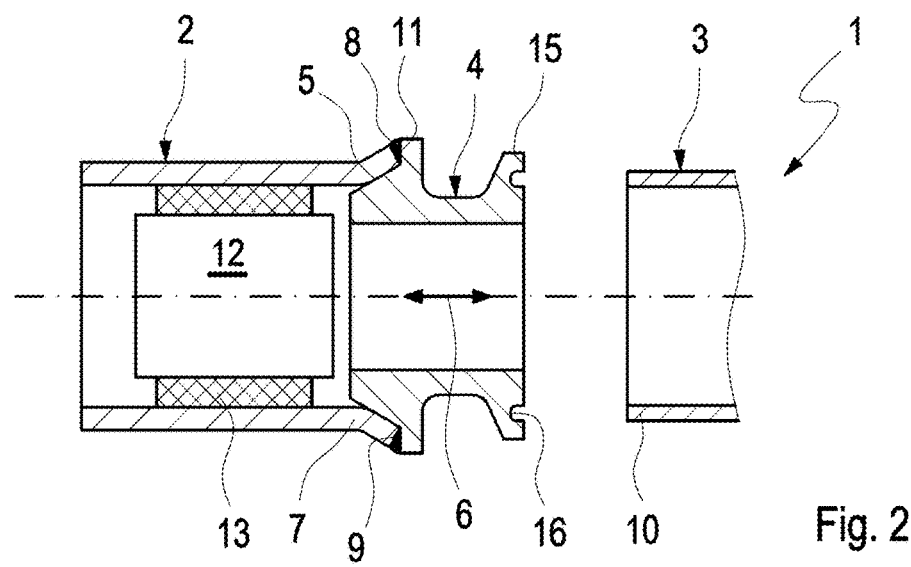
FIG. 2 is a sectional view as in FIG. 1, however during the manufacturing of the joint.

In order to be able to join the two components 2, 3 firmly and, more preferably gas-tight with each other, the assembly 1 additionally comprises a ring-shaped joining element 4. The joining element 4 comprises an outer cone 5 at least on one axial side. With this outer cone 5 the joining element 4 can be pressed into an axial end section 7 of the first component 2 in axial direction 6 indicated by a double arrow or is pressed into the assembly 1 in the assembled state. FIG. 1 shows the joining element 4 prior to the pressing-in of its outer cone 5 in the end section 7 of the first component 2. FIG. 2 then shows the pressed-in state. It is noticeable that the end section 7 widens upon the pressing-in of the outer cone 5. In order to now join the joining element 4 with the first component 2, a circumferential weld seam 8 is produced specifically on an axial end 9 of the end section 7 and on the joining element 4. To complete the assembly 1, the second component 3 is additionally mounted with an axial end section 10 on the joining element 4.

The widening of the end section 7 of the first component 2 on the outer cone 5 results in a flat and no-play contact between first component 2 and joining element 4. Even by this alone, the production of the weld seam 8 is substantially simplified. For example, the weld seam 8 can be realized particularly simply with high quality as well as gas-tight. More preferably automated production of the weld seam 8 can be simplified since no ring gap between first component 2 and joining element 4 has to be closed, which along the circumference additionally can have a varying gap width. The pressing-in of the connecting element 4 in the end section 7 is performed in such a manner that the axial end 9 of the end section 7 is widened to a predetermined cross section. This is an advantage for automated production of the weld seam 8. Particularly favorable is the version shown here wherein, on the joining element 4, an axial stop 11 is formed, wherein the pressing-in of the joining element 4 is carried out in such a manner that the axial end 9 of the widening end section 7 comes to bear against said axial stop 11. On reaching the axial stop 11, the predetermined cross section for the axial end 9 of the widening end section 7 is also available. At the same time an axial position between first component 2 and joining element 4 is defined here. Insofar, the axial stop 11 simplifies automated production of reproducible weld seams 8 of high quality.

Figure 4:
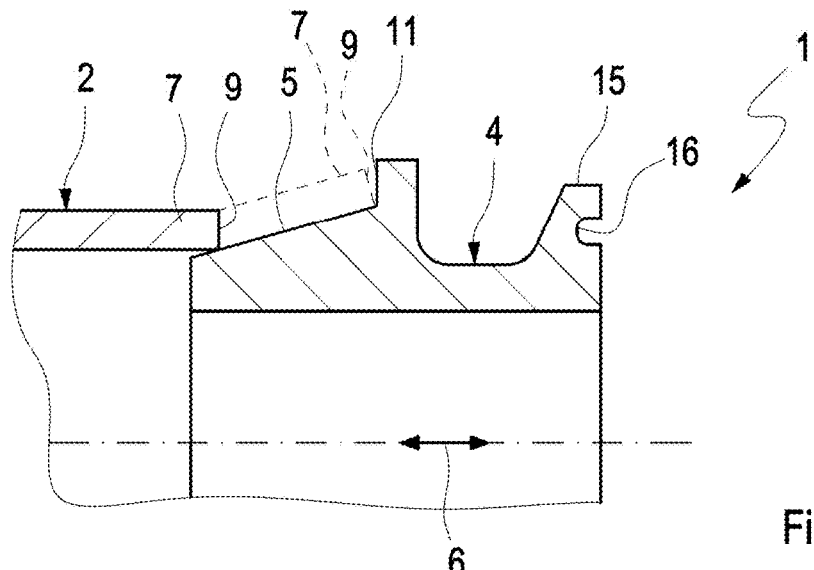
FIG. 4 is a simplified sectional view of the assembly during the sliding-in of a joining element in an end section of a component.
Figure 5:
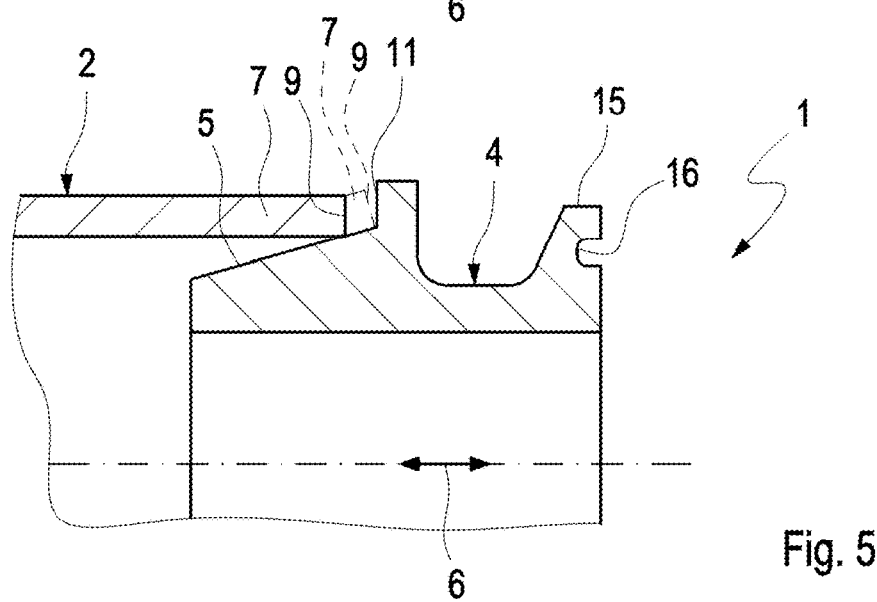
FIG. 5 is a representation as in FIG. 4, however with another configuration.

With the preferred embodiments shown here, the first component 2 is a cylindrical housing of an exhaust gas treatment device which can be a particle filter or a catalytic converter. The first component 2 or the housing 2 serves to accommodate at least one insert 12 for exhaust gas retreatment. This insert 12 is a particle filter element or a catalytic converter element. The insert 12 consists of a ceramic material such as for example cordierite, and can be manufactured as a monolith, for example through extrusion. The insert 12 is enveloped with a bearing mat 13. The housing 2 or the first component 2 is calibrated, which means its cross section is matched with respect to the dimensions of the insert 12 and the bearing mat 13. This matching or calibration regularly takes place in that, through a cross section reduction of the jacket-shaped first component 2, a predetermined radial gap dimension between the insert 12 and the first component 2 is established in order to realise predetermined radial compression or preloading of the bearing mat 13. Since the inserts 12 can only be manufactured with comparatively large shape tolerances or dimensional tolerances, the cross sections of the first components 2 also vary after the calibration process. The outer cone 5 of the joining element 4 during the axial pressing-in of the outer cone 5 in the axial end section 7 of the first component 2 now ensures that the respective axial end 9 rests against the joining element 4 gap-free and flat and has the predetermined cross section. Depending on the size of the calibrated cross section of the first components 2, the widening of the end section 7 during the pressing-in of the connecting element 4 is larger or smaller in size. FIG. 4 shows a configuration wherein the end section 7 has to be widened comparatively greatly until its axial end 9 comes to bear against the stop 11. In contrast with this, FIG. 5 shows a configuration where the end section 7 has to be widened comparatively little so that its end 9 comes to bear against the stop 11. The views of FIGS. 4 and 5 make it clear here that, independent of the cross section of the calibrated first component 2, after the pressing-in of the joining element 4, always the same cross section is present on the axial end 9 on which cross section a high-quality weld seam 8 can then be produced in a particularly simple manner.

Figure 3:
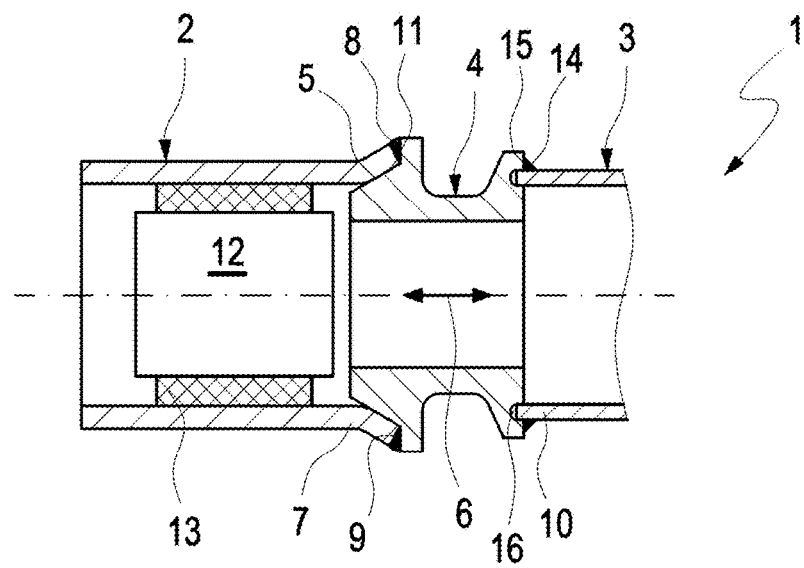
FIG. 3 is a sectional view as in FIGS. 1 and 2, however after the manufacturing of the joint.

According to FIGS. 1-3, the second component 3 can for example be a tubular body. On its end section 10 facing the first component 2, it has a predetermined cross section. The joining element 4 is adapted to this predetermined cross section as a result of which a high-quality weld joint between the second component 3 and the joining element 4 can be produced particularly simply in a conventional manner. For example, according to FIG. 3, a circumferential weld seam 14 is likewise suitable for this. Since during the manufacture of the joining element 4 and the second component 3 comparatively close tolerances can be maintained, an outer cone 5 for achieving defined cross section can be omitted here.

For joining the second component 3, the joining element 4 with this embodiment has a suitable joining region 15 on its other axial side facing away from the outer cone 5, which simplifies the joining of the second component 3 designed as a tubular body. For example, this joining region 15 can have a ring-shaped receiving slot 16 into which the second component 3 dips axially. In the example, the joining region 15 is designed as a flange 15.

Figure 3A:
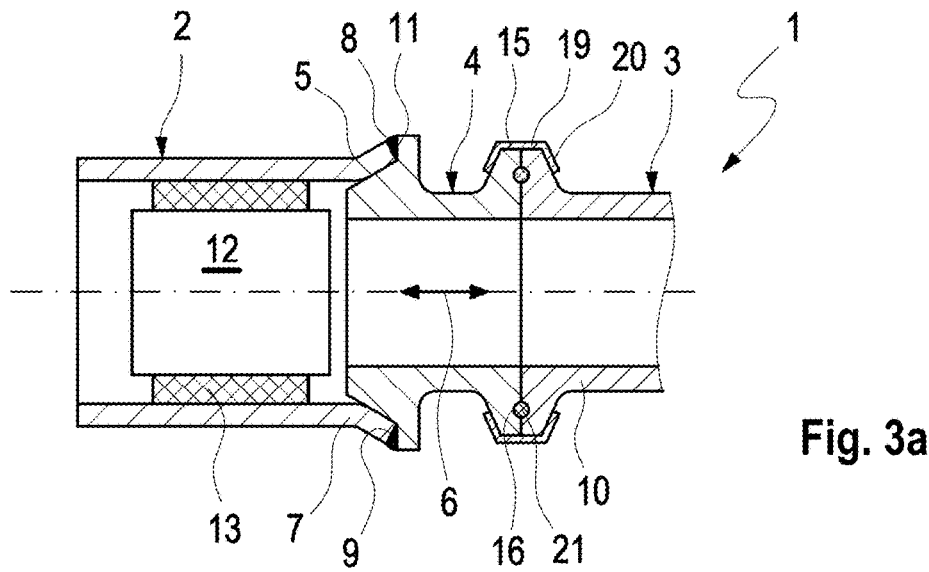
FIG. 3a is a sectional view as in FIG. 3, however with another embodiment.

Alternatively to this, the second component 3 according to FIG. 3a on its end facing the first component 2 can comprise a flange 19 or be formed through such a flange 19. The flange 19 is designed complementarily or symmetrically to the flange 15. In the example, the flanges 15, 19 are joined with one another by means of a clamp 20, more preferably a V-band clamp 20. A screw joint is likewise conceivable. In this flange joint, a closed ring-like circumferential sealing element 21 can be arranged.

Figure 6:
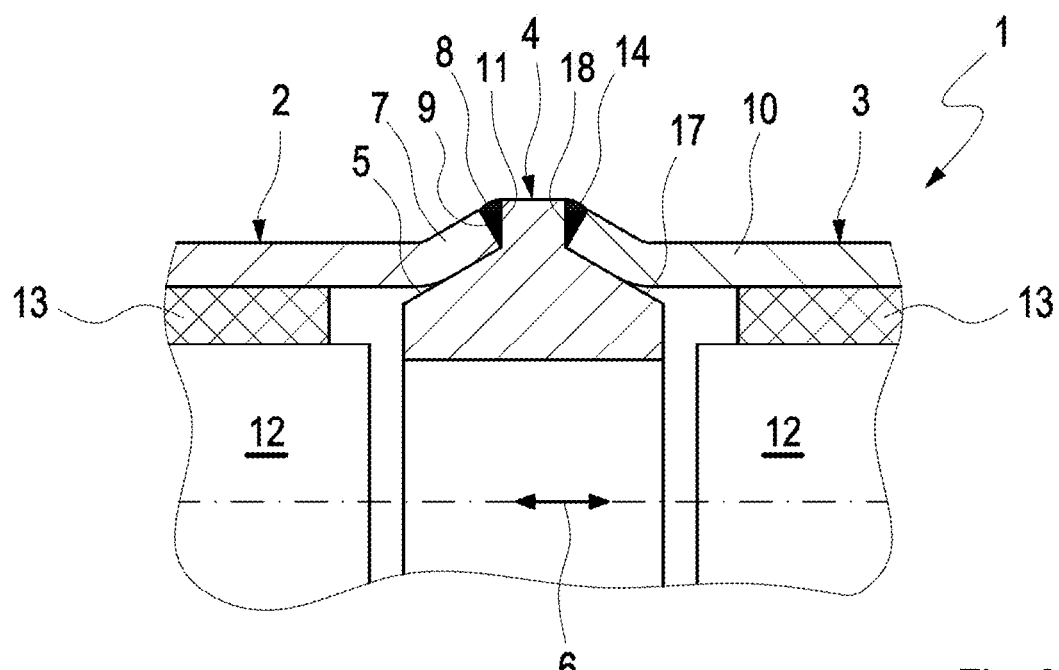
FIG. 6 is a sectional view through the assembled assembly however with another embodiment.

According to FIG. 6, the second component 3 can also be a tubular housing, which likewise serves to accommodate at least one exhaust gas treatment insert 12 and, which likewise can be calibrated with respect to its cross section. Since varying cross sections can also occur here, the joining element 4 with this embodiment likewise comprises an outer cone 17 on its other axial end which is pressed into the axial end section 10 of the second component 3 in order to achieve widening of the end section here as well. In the example, a second axial stop 18 is also formed on the joining element 4, which defines the axial position and the widened cross section of the axial end section 10. The joining element 4, with the embodiment shown in FIG. 6, is practically designed mirror-symmetrically, specifically with respect to a symmetry plane which runs vertically to the axial direction 6. The joining element 4 in this example serves for the joining of two components 2, 3 of an exhaust gas treatment device.

Figure 7:
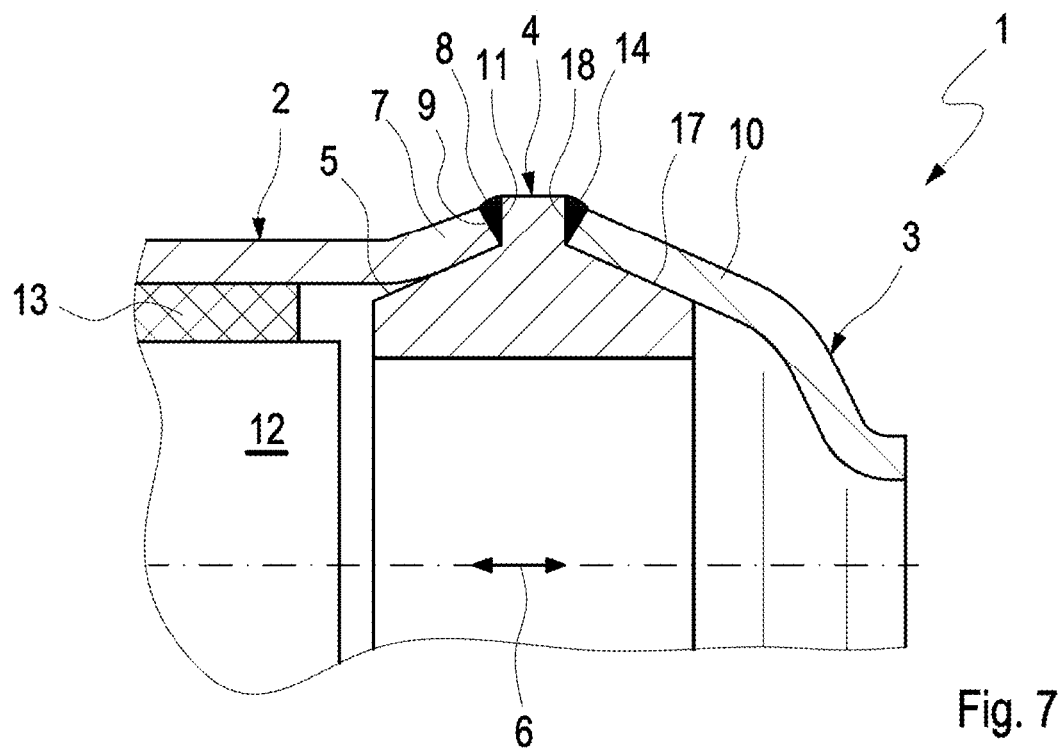
FIGS. 7-9 are sectional views as in FIG. 6, however with further embodiments.
Figure 8:
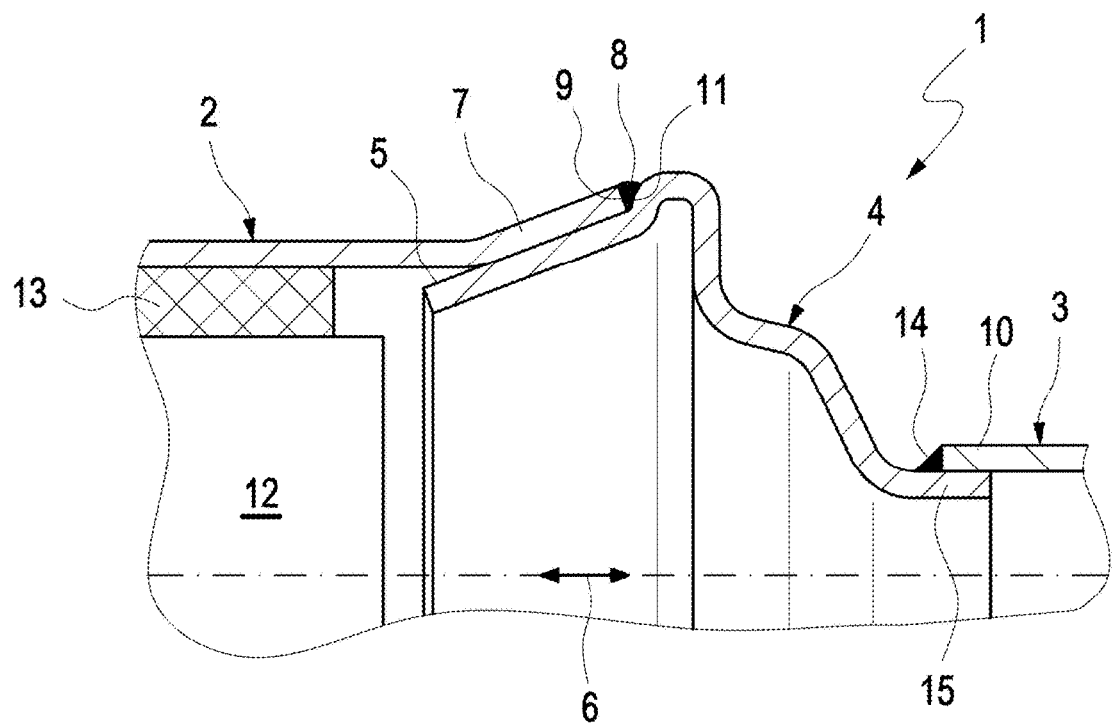
Figure 9:
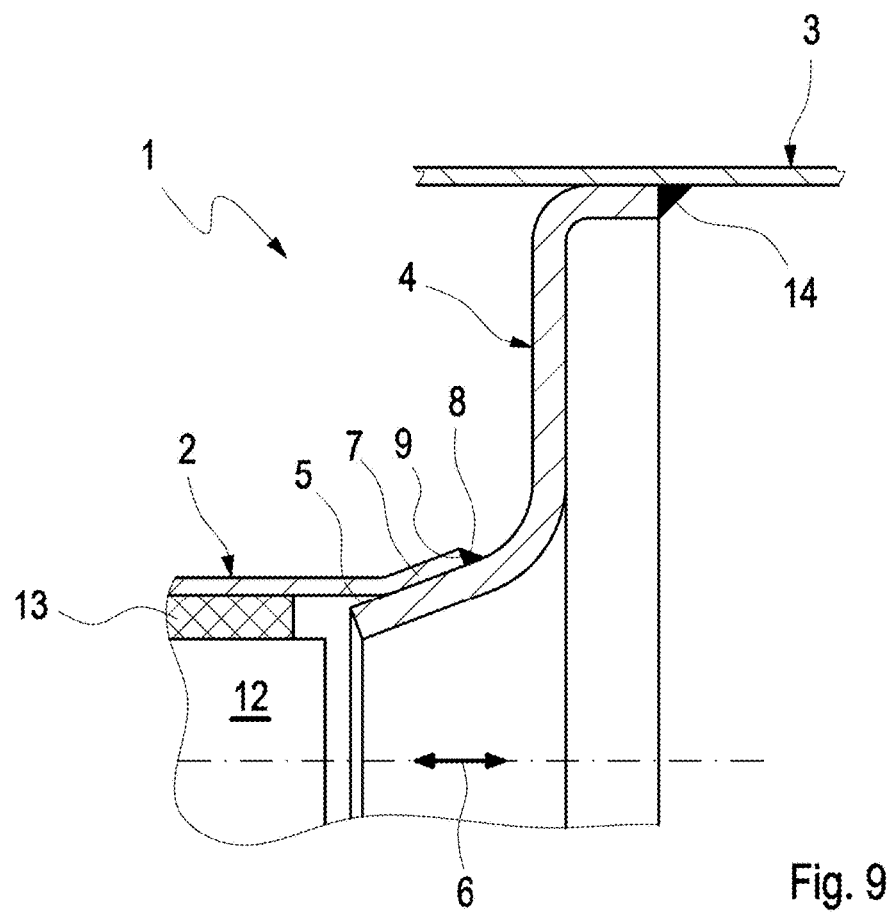

With the embodiment shown in FIG. 7, the joining element 4 as with the embodiment shown in FIG. 6 comprises two outer cones 5, 17, wherein here it is indicated that a mirror symmetry of the two outer cones 5, 17 is not always required. With this embodiment, the second component 3 is designed as transition funnel with the help of which the first component 2 can be connected to a tubular body which is not shown here, wherein said tubular body, on its end section facing the second component 3, can have a predetermined cross section to which the complementary end section of the transition funnel, i.e., of the second component 3, is adapted. With this embodiment, the second outer cone 17 makes it possible to produce the second component 3 with larger dimensional tolerances in the region of the end section 10 facing the first component 2.

Alternatively, an embodiment is additionally conceivable wherein the second component 3 is designed as a flange with which the first component can be fastened for example to a tubular body with predetermined cross section or to a wall. It is likewise possible to design the second component 3 itself as a wall which has an opening for connecting the first component, wherein this opening can comprise a predetermined cross section. Insofar as a predetermined opening cross section is present, the desired proper joint between the two components 2, 3 can be realized with the joining element 4 having a complementary connection section 15. Insofar however as the opening cross section can vary in a comparatively large tolerance interval, the version of the joining element 4 shown in FIGS. 6 and 7 can be used which has two outer cones 5, 17.

With the embodiments shown here, the respective outer cone 5, 17 in the axial sections shown each has a straight-line profile which is inclined relative to the axial direction 6. This produces a kind of ramp contour with constant incline. However, other profiles for the respective outer cone 5, 17 are also conceivable in principle. For example, the respective outer cone 5, 17 in the axial section can have a profile which is concavely curved towards the respective component 2, 3. In other words, the respective ramp contour along its length has a varying incline which rises in the insertion direction.

With the embodiment shown in FIGS. 1-7, the joining element 4 has the function of joining the two components 2, 3 with each other. With the embodiments of FIGS. 8 and 9, the joining element 4 has an additional function in addition to this joining function. With the embodiment shown in FIG. 8, the joining element 4 is designed as a transition funnel which thus realizes a cross-sectional change between the two components 2, 3. With the embodiment shown in FIG. 9, the joining element 4 is designed as a wall through which the first component 2 can be positioned within the second component 3. The second component 3, for example, is a housing which with the help of the respective wall 4 or with the help of the respective joining element 4 can be stiffened or sectioned. With the embodiments of FIGS. 8 and 9, the joining element 4 can be a thick-walled formed sheet-metal part. For example, a wall thickness of the joining element 4 with these embodiments is at least twice as thick as the wall thickness of the first component 2 and/or the second component 3. The formed sheet-metal part can, for example, be produced by means of internal high-pressure forming. The joining element 4 can, according to the embodiments of FIGS. 1-7, practically be also a sintered part or a turned part or a cast part. The joining element 4 can be produced from a ferrite steel or from an austenite steel. The two components 2, 3 are then practically also produced of ferrite or of austenite. Insofar as the one component 2, 3 is produced of ferrite and the other component 2, 3 of austenite, the joining element 4 can be produced of a duplex material, which is a two-phase material which, in its structure, contains a ferrite phase and an austenite phase. Through such a design, thermally-induced stresses between the ferrite component and the austenite component can be significantly reduced, which substantially improves the fatigue durability of the assembly 1.

With the embodiments shown, the connecting element 4 is only arranged on an axial side of the first component 2 in order to join this with a second component 3. It is clear however that, in principle, a further joining element 4 can also be provided in principle on the other axial side of the first component 2 in order to join the first component 2 there with a third component not shown here. The joining technique introduced here is used to manufacture or incorporate an exhaust gas treatment device in an exhaust system. The tubular or ring-shaped components shown here, i.e. the first component 2, the second component 3 and the joining element 4 have cylindrical cross sections, circular cylindrical cross sections, or any other rounded cross sections.

What is claimed is:

1. A method for the joining of two components of which at least one is tubular in shape, comprising the steps of:
   providing a ring-shaped joining element having at least an outer cone on an axial side, the ring-shaped joining element defining a passage therethrough having a diameter substantially smaller than an inner diameter of the tubular component, wherein the outer cone is axially pressed into an axial end section of the tubular component, as a result of which the axial end section of the tubular component widens along the outer cone;
   wherein, on an axial end of the widened axial end section and on the ring-shaped joining element, a circumferential weld seam is produced; and
   wherein a second component on an axial end section thereof is joined with the ring-shaped joining element.

2. The method according to claim 1, wherein the ring-shaped joining element with its outer cone is axially pressed into the axial end section of the tubular component, the axial end section widening until the axial end of the axial end section of the tubular component reaches a predetermined cross section and/or until the axial end of axial the end section of the tubular component comes to bear against an axial stop formed on the ring-shaped joining element so that the circumferential weld seam is produced on the predetermined cross section.

3. The method according to claim 1, wherein the tubular component contains at least one insert for exhaust gas treatment and a cross section which is calibrated with respect to the at least one insert.

4. The method according to claim 1, wherein the second component contains at least one insert for exhaust gas treatment and a cross section which is calibrated with respect to the at least one insert.

5. The method according to claim 1, wherein the second component is configured as a transition funnel or as a flange, the second component joinable by means of a screw joint or by means of a V-band clamp to the ring-shaped joining element, wherein the axial end section of the second component facing the tubular component has a predetermined cross section.

6. The method according to claim 1, wherein the second component is a tubular body which on its end section facing the tubular component comprises a predetermined cross section and/or a flange.

7. The method according to claim 1, wherein the second component is a wall, the wall defining an opening for connecting and/or inserting the ring-shaped joining element, and wherein the opening can have a predetermined cross section.

8. The method according to claim 1, wherein the ring-shaped joining element on its other axial side comprises a joining region which is adapted to a predetermined cross section of the second component.

9. The method according to claim 1, wherein the outer cone in an axial section has a straight-line profile which is inclined relative to an axial direction.

10. The method according to claim 1, wherein the outer cone in an axial section has a profile which is concavely curved towards the tubular component.

11. The method according to claim 1, wherein the ring-shaped joining element is configured as a transition funnel, a flange, or a wall with which the tubular component can be connected to the second component which is configured as a tubular body.

12. The method according to claim 1, wherein the circumferential weld seam is so produced that it circulates in a closed, ring-shaped manner.

13. The method according to claim 1, wherein the two components are of an exhaust system of an internal combustion engine.

14. The method according to claim 1, wherein the ring-shaped joining element on its other axial side has a further outer cone, wherein the further outer cone is axially pressed into an axial end section of the second component, as a result of which the axial end section of the second component widens along the further outer cone.

15. The method according to claim 14, wherein, on an axial end of a widened axial end section of the second component and on the ring-shaped joining element, a separate circumferential weld seam is produced spaced from the circumferential weld seam on the axial end of the widened axial end section of the tubular component and on the ring-shaped joining element.

16. The method according to claim 15, where the circumferential weld seam and the separate circumferential weld seam are separated by an axial stop formed on the ring-shaped joining element.

17. The method according to claim 1, wherein the second component on the axial end section thereof is joined with the ring-shaped joining element by a separate circumferential weld seam.

18. The method according to claim 3, wherein the at least one insert for exhaust gas treatment includes a bearing mat positioned between the at least one insert and the tubular component, and the calibrated cross section of the tubular component applies a predetermined radial compression on the bearing mat.

19. The method of claim 3, wherein the diameter of the passage through the ring-shaped joining element is smaller than a diameter of the at least one insert.

20. The method according to claim 6, the ring-shaped joining element joined to the second component by means of a screw joint or by means of a V-band clamp.

* * * * *